United States Patent [19]

Hanning et al.

[11] Patent Number: 4,605,214
[45] Date of Patent: Aug. 12, 1986

[54] LABEL HANDLING APPARATUS

[76] Inventors: Bernard W. Hanning, 49, St. Jude's Road, Englefield Green, Egham, Surrey; John N. Dent, 2, Ellerman Avenue, Twickenham, Middlesex, both of United Kingdom

[21] Appl. No.: 610,279

[22] PCT Filed: Sep. 6, 1983

[86] PCT No.: PCT/GB83/00219
§ 371 Date: May 7, 1984
§ 102(e) Date: May 7, 1984

[87] PCT Pub. No.: WO84/01045
PCT Pub. Date: Mar. 15, 1984

[30] Foreign Application Priority Data

Sep. 6, 1982 [GB] United Kingdom ............... 8225326

[51] Int. Cl.$^4$ .............................................. B65H 1/08
[52] U.S. Cl. ................................ 271/3.1; 271/128; 271/147; 271/157; 221/198; 414/119
[58] Field of Search ............ 414/117, 118, 119, 417; 221/198, 231, 197, 232; 271/3.1, 147, 157, 158, 164, 42, 128, 129

[56] References Cited

U.S. PATENT DOCUMENTS 3,741,537 6/1973 Lange ............................ 271/164
3,887,106 6/1975 Charlson et al. .............. 221/197
3,987,911 10/1976 Euverard et al. ............... 271/164

FOREIGN PATENT DOCUMENTS 1459979 10/1965 France .
1380047 1/1975 United Kingdom .

OTHER PUBLICATIONS

IBM Technical Disclosure Bulletin, "Stub Ticket Cartridge", by D. F. Colglazier and R. J. Ullmer, vol. 15, No. 11, Apr. 1973, pp. 3410 and 3411.
IBM Technical Disclosure Bulletin, "Paper Bin", by J. A. Craft, vol. 17, No. 5, Oct. 1974, p. 1308.
IBM Technical Disclosure Bulletin, "Automatic Mail Tray Loader and Unloader", by J. S. Brancke, J. M. Fuscoe and M. P. Nashman, vol. 16, no. 6, Nov. 1973, p. 1886.
IBM Technical Disclosure Bulletin, "Envelope Loading Module", by R. E. Hunt and W. M. Jenkins, vol. 17, No. 6, Nov. 1974, p. 1549.

Primary Examiner—Bruce H. Stoner, Jr.
Assistant Examiner—Matthew C. Graham
Attorney, Agent, or Firm—Darby & Darby

[57] ABSTRACT

A label handling system, particularly for use in supermarkets. The system includes a plurality of boxes (108) for receiving parts of labels (103) from merchandise (106). The box with a stack of labels in it is placed in the box-receiving station (109) where the labels are fed upwardly into a downwardly facing hoppper. Labels are sequentially removed from the top of the stack in the hopper and passed through a data reading station (112) at which price and weight data are read from the labels and subsequently further processes (113, 114, 115).

10 Claims, 3 Drawing Figures

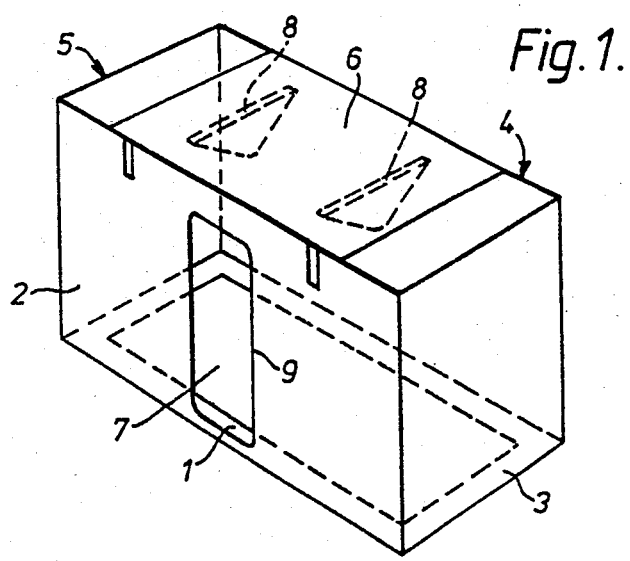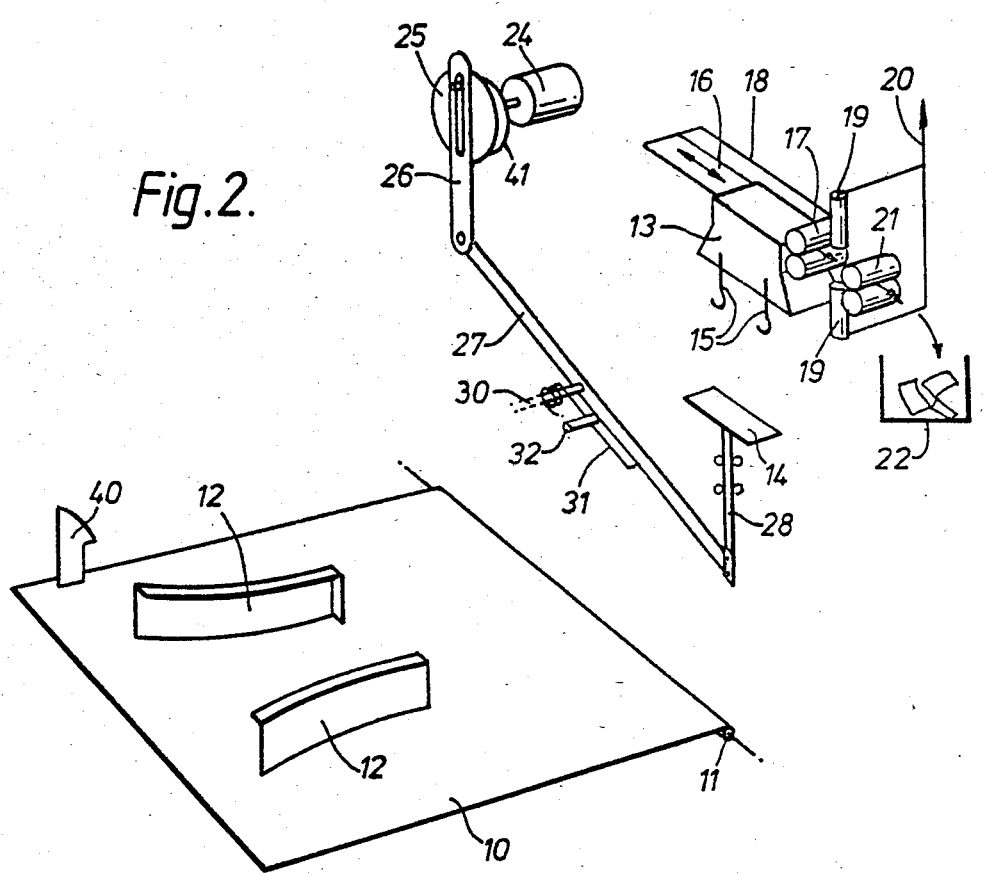

LABEL HANDLING APPARATUS

This invention relates to label handling apparatus.

British Patent Specification No: 1,380,047 describes and claims means for controlling the sale of goods in a self-service store which comprise for inter-related use price/weight tokens which may be attached to, or otherwise associated with, each item of merchandise and which carry or embody machine-readable means in code or otherwise identifying both the price of the item and its weight, a basket, trolley or the like for carrying goods and having an identified tare weight, a weight platform on to which the merchandise including the basket, trolley or the like may be placed, means for reading the price and weight data from a plurality of price/weight tokens and for totaling the price and weight data and means for displaying the total weight on the weighing platform.

Such systems are valuable in speeding check-out procedures in supermarkets.

The present invention is directed specifically to label handling apparatus for use in carrying out the method of Patent No: 1,380,047.

According to a first feature of the present invention there is provided a label handling system comprising a plurality of label-receiving boxes, apparatus including a box-receiving station, means for ejecting the labels from a box placed in the box-receiving station into a downwardly facing hopper and means for removing labels sequentially from the top of the stack in the hopper and passing labels so removed through a data reading station at which price and weight data are read from the labels and subsequently further processed.

In accordance with the invention, a plurality of label-receiving boxes are provided for the shopper. Each time an article of merchandise is selected by the shopper and placed in the basket, trolley or the like, its label is detached and placed in the box. Preferably, in accordance with the invention the box consists of a generally rectangular parallelepipedic box having a base, four walls and a lid, the lid being smaller than the size of the box or having one or more apertures therein to enable insertion of the labels into the box.

Preferably, the interior of the lid bears deflector plate means ensuring that labels, however inserted, stack neatly in the box. Preferably, the base of the box has one or more apertures therein through which means may be inserted to eject a stack of labels from the box into the downwardly facing hopper.

The lid of the box is preferably hinged and the entire box is preferably made as a one-piece resilient plastics moulding. The shape and dimensions of the box will naturally correspond to those of the tickets or labels with which it is designed to be used.

At each check-out, a box receiving station is arranged into which a box is inserted either by the shopper or by the check-out operative. This may conveniently take the form of a hinged flap having box-receiving and aligning means thereon which can be hinged from an open position in which a box may be placed therein by hand to a closed position in which label ejection means may remove the labels from the box. The label ejection means may consist, for example, of a mechanically or hydraulically operated lifting table arrange to pass through an aperture in the bottom of the box and to lift the labels thereon upwardly into a downwardly facing hopper located above the lifting table.

The stroke of the lifting table may be in two sections, a first section designed to eject the labels from the box and feed them into the hopper and a second section during which the label stack is gently biased towards the top of the hopper from which the labels are successively removed.

The labels are preferably removed by means of a label engaging blade which is reciprocated to one end of the generally rectangular section hopper, which serves to eject the labels one by one from a slot at the top of the hopper into the nip between a pair of constantly rotating rollers. These rollers may then feed the label through a further pair of rollers, optical reading heads being located to each side of the label path between the two pairs of rollers. The labels may then be collected in a suitable receptacle to allow them to be subsequently checked if that proves necessary.

The sequence of operations just outlined may be initiated by the closing of the flap at the check-out station whereafter the checking of the price and weight data, the adding of the bill and the financial transaction necessary may take place speedily and efficiently.

The invention is illustrated by way of example with reference to the accompanying drawings in which:

FIG. 1 is a perspective view of a suitable label receiving box.

FIG. 2 is a perspective view of a box receiving and label removing station, and

Figure 3:
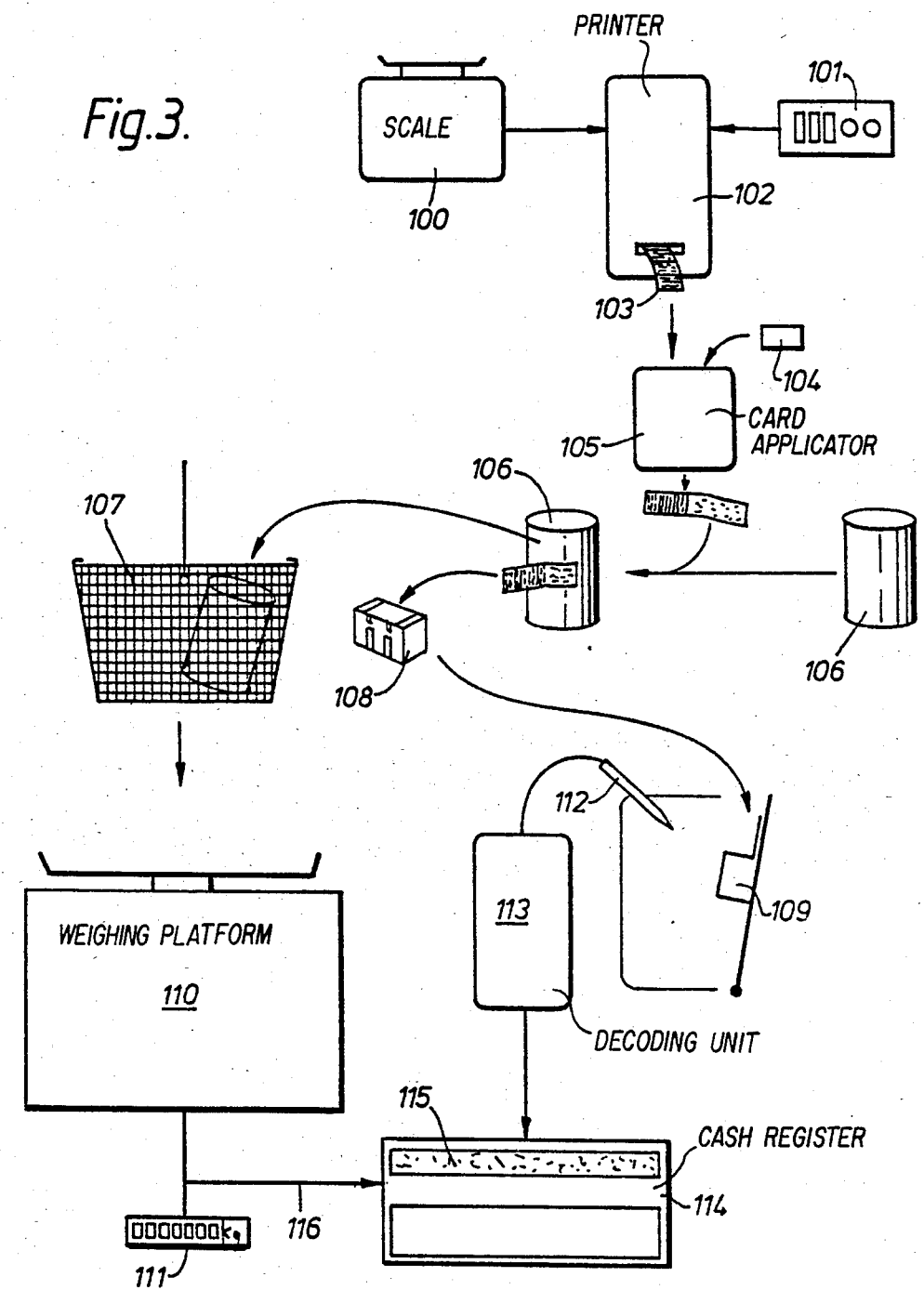
FIG. 3 is a diagram of the operative parts of the complete system.

Referring first of FIG. 3, this shows an overall system for use in a supermarket. First, the supermarket weighs each item of merchandise on a scale 100 and at the same time sets is price on a setting mechanism 101 of known type. Outputs from scale 100 and price setting mechanism 101 are fed to a label printer 102 of standard type which prints a label 103 having two portions: one bears a barcode including price and weight data, the other bears human-readable price and weight data and, optionally, other data such as product type and price per unit weight. A simple machine 105 then applies to one end of each so printed label a stiffening card 104 of standard size. The printed label may be printed on adhesive stock to facilitate uniting it with card 104. Thereafter the label is attached to the merchandise item, here exemplified as a tin can 106.

In the store, a shopper who decides to purchase the merchandise takes it and places it in a basket 107 of known tare weight. The stiffened portion of the label is simply detached and put in a box 108 provided for the purpose. This is repeated for each item of merchandise.

At the check-out, the full basket is placed on a weighing platform 110, and the total weight displayed on a display 111. At the same time, the check-out operative loads box 108 with cards into a chute 109 and moves it into a mechanism described further below, which, with the aid of a light pen 112, reads the bar coded data which are fed via a decoding unit 113 of known type to an "intelligent" cash register 114 (e.g. of the type made by Riva). Cash register 114 has a display 115 which can show totals both of weight and price data. Visual comparison of displays 111 and 115 (or electronic comparison via a lead 116) checks the identity which should be present between the weight data from the labels and the total weight of merchandise selected, after taking into account the tare weight of basket 107. The normal display will be accurate to 1 gm, and "identity" may be assumed if the two weights differ by e.g. less than 6 gm.

If the two displays differ substantially, the check-out operative can then check the goods one by one. If not, the shopper pays the amount displayed and proceeds.

This general system includes two components shown in more detail in FIGS. 1 and 2, viz. box 108 and chute 109/light pen 112 respectively. Referring first to FIG. 1, a typical box 108 consists of a base 1, four walls, 2, 3, 4, 5 and a lid 6. The base 1 has a large central rectangular aperture 7 through which a lifting table may be inserted. The lid has two triangular plates 8 mounted thereon which serve to ensure that the stiffened label portions put into the box from the slots formed at the ends between the lid and the walls form a neat stack in the base of the box. The front wall of the box has a window 9 to enable it to be seen whether the box contains any labels or not and additionally the top edge of the wall 2 has two slots which can be engaged by prongs to open the lid automatically when the box is inserted into the label reading device described below and shown in FIG. 2. The box is conveniently made as a one-piece plastic moulding from a resilient plastic material. The top 6 can be hinged to wall 4 by a relatively thin moulded section. The free edge of top 6 opposite the hinge may be configured to latch resiliently on the top edge of wall 2.

Referring now to FIG. 2, this shows in diagrammatic perspective view apparatus at a checkout for dealing with a box full of labels.

The apparatus is arranged in a suitable housing having a door 10 hinged about a horizontal hinge line 11. On the inside of door 10 are a pair of guides 12 into which a box may be inserted. The door 10 may then be rotated to a vertical position which locates the box securely at the end of the guideway formed by the pair of guides 12 and inserts it into a label removing position. This label removing position is located between a downwardly facing hopper 13 and a lifting table 14. The side of the hopper 13 adjacent the door 10 bears a pair of resilient prongs 15 which serve to open the box lid 6 as the door 10 is closed and hold it against door 10 with plates 8 clear of vertically above the box interior. A tooth 40 on the door latches over a latch bar (not shown) to hold the door closed.

Lifting table 14 is arranged as described below to move up passing through aperture 7 at the base of the box and lifting the labels therein and putting them into the bottom of hopper 13. A reciprocating blade 16 acts to push successive labels through a slot at one end of the hopper so that the leading edge of the label is engaged between a pair of continuously driven rollers 17. One of the roller pair 17 has an eccentric drive bearing on its axle which reciprocates blade 16 via connection rod 18. A label passing between rollers 17 then passes between two optical reading heads, so-called light pens, 19 which send a signal via a lead 20 to the electronic data processing apparatus 113, 114. The labels then pass through the nip between a further roller pair 21 and fall into a collection basket 22. To ensure smooth drive of the labels, roller parts 17 and 21 are preferably positively driven together, e.g. by toothed gearing or toothed belts connecting the upper and lower rollers of each pair.

Actuation of the lifting table 14 may take place automatically on closing the door 10 e.g. via a microswitch which controls the operation of a stepping drive motor 24 linked to table 14 and via a drive disc 25, a lost motion link 26, a generally horizontal link 27 and a vertical shaft 28. There is a short pivotal link between links 27 and shaft 28 to ensure easy movement and compensate for the angular movement of the end of link 27 compared with the vertical straight line movement of shaft 28 and table 14.

Link 27 pivots about a central fixed axis 30 and is resiliently biased upward for the first part of its travel by a strong spring 31 as shown. Located above the extending arm of spring 31 is a stop 32 which accordingly divides the vertical motion of table 14 into two sections, a first lower section during which it is biased upwardly by the force of spring 31 and an upper section during which it is pushed upwardly by the weight of lost motion link 26.

As shown in FIG. 2, the table is in its lowermost position, having been pulled down to that position against the force of spring 31 by the rotation of drive disc 25 to the position shown. When the door is closed, stepping drive motor 24 rotates 180° so the pin in drive disc 25 then lies at its lowermost point. As that movement is effected, table 14 rises under the influence of spring 31, engages the stack of labels and pushes them firmly into the hopper 13. Once there, spring 31 engages on stop 32 and the stack of labels is then biased gently upwards by the weight of link 26. At this stage the pin on disc 25 is near the bottom of the slot in link 26. As labels are removed from the stack in hopper 13, link 26 gently drops and table 14 rises until the last label has been fed. When that position is indicated, e.g. by electrical contact between table 14 and the member located in the top of hopper 13, or by means of a suitably mounted microswitch, stepping drive motor is actuated and disc 25 rotated a further 180° to return the apparatus to the position shown in FIG. 2.

The shaft of motor 24 also bears one or more control cams 41 which, with the aid of associated microswitches, control the sequence of operations. In particular as the table 14 approaches its lowermost position, after it has cleared the base of the box 108, such a cam may operate a microswitch to actuate a solenoid (not shown) to move a latching bar and so unlatch tooth 40 allowing door 10 to open, e.g. under the influence of a spring associated with hinge 11.

We claim:

1. A label handling system comprising: a plurality of label-receiving boxes, apparatus including a box-receiving station, means for ejecting upwardly a stack of labels from a label containing box placed in the box-receiving station into a hopper having a downwardly opening aperture for receiving a stack of labels, and means for removing labels sequentially from the top of the stack in the hopper and passing labels so removed through a data reading station at which price and weight data are read from the labels and subsequently further processed.

2. A system according to claim 1 wherein the box is generally rectangular and parallelepipedic and has a base, four walls and a lid, the lid being smaller than the size of the base.

3. A system according to claim 2 wherein the interior of the lid bears deflector plate means ensuring the labels, however inserted, stack neatly in the box.

4. A system according to claims 2 or 3 wherein the base of the box has at least one aperture therein through which means may be inserted to eject a stack of labels from the box into the downwardly facing hopper.

5. A system according to any one of claims 2 or 3 wherein the lid of the box is hinged and the entire box is made as a one-piece resilient plastic moulding.

6. A system according to any one of claims 1 to 3 wherein the box receiving station includes a hinged flap having box-receiving and aligning means thereon which can be hinged from an open position in which a box may be placed therein by hand to a closed position in which label ejection means may remove the labels from the box.

7. A system according to claim 6 wherein the label ejection means includes one of a mechanically and hydraulically operated lifting table arranged to pass through an aperture in the base of the box and to lift the labels thereon upwardly into a downwardly facing hopper located above the lifting table.

8. A system according to claim 7 wherein the stroke of the lifting table is in two sections, a first section designated to eject the stack of labels from the box and feed them into the hopper and a second section during which the label stack is gently biased towards the top of the hopper from which the labels are successively removed.

9. A system according to any one of claims 1 to 3 wherein the means for removing the labels includes a reciprocating label engaging blade located to one end of a generally rectangular section hopper, and which serves to eject the labels one by one from a slot at the top of the hopper into a nip between a pair of constantly rotating rollers, which then feed the label through a further pair of rollers, optical reading heads being located to each side of the label path between the two pairs of rollers.

10. A system according to claim 1 wherein said box is generally rectangular and parallelepipedic and has a base, four walls and a lid, the lid having at least one aperture therein to enable insertion of the labels into the box.

* * * * *